United States Patent [19]

Okazaki et al.

[11] Patent Number: 4,831,312
[45] Date of Patent: May 16, 1989

[54] SPEED CONTROL DEVICE FOR D-C MOTORS

[75] Inventors: Akira Okazaki; Hiroshi Minami, both of Matsudo, Japan

[73] Assignee: Mabuchi Motor Co., Ltd., Japan

[21] Appl. No.: 188,033

[22] Filed: Apr. 29, 1988

Related U.S. Application Data

[63] Continuation-in-part of Ser. No. 865,160, May 19, 1986.

[30] Foreign Application Priority Data

May 23, 1985 [JP] Japan .................................. 60-111229

[51] Int. Cl.⁴ .............................................. H02P 5/00
[52] U.S. Cl. ..................................... 388/815; 388/824; 388/902; 388/930; 388/934; 388/935
[58] Field of Search ............... 318/301, 317, 308, 257, 318/327, 331, 328, 339, 332

[56] References Cited

U.S. PATENT DOCUMENTS 4,011,491  3/1977  Grover ................................. 318/327
4,168,455  9/1978  Soeda ................................... 318/317

*Primary Examiner*—William M. Shoop, Jr.
*Assistant Examiner*—Gary J. Romano
*Attorney, Agent, or Firm*—McGlew & Tuttle

[57] ABSTRACT

A speed control device for d-c motors includes an IC control circuit having such a construction that a reference voltage is generated across two of its terminals C and D. Additionally, a current proportional to the armature current of the d-c motor is kept flowing in the terminal D at all times. A transistor is connected across the terminals C and D of the control circuit so that motor revolution can be changed linearly by means of a variable resistor connected in parallel across the base and collector of the transistor. With this arrangement, the revolution of d-c motors can be accurately controlled.

9 Claims, 3 Drawing Sheets

SPEED CONTROL DEVICE FOR D-C MOTORS

REFERENCE TO ANOTHER APPLICATION

This application is a continuation-in-part of application Ser. No. 865,160 filed May 19, 1986, and which was based on Japanese application No. 111229/85 of May 23, 1985.

BACKGROUND OF THE INVENTION

1. Field of the Invention

This invention relates generally to a speed control device for d-c motors, and more particularly to a speed control device for d-c motors which is capable of controlling motor operation at any desired speed settings.

2. Description of the Prior Art

A conventional speed control device for controlling the speed of a d-c motor typically includes a circuit arrangement as shown in FIG. 1. This arrangement includes a reactor or inductor $L_1$; a capacitor $C_1$, a diode $D_1$; resistors $R_1$, through $R_3$; a variable resistor $VR_1$; a d-c motor M; and a control circuit 1, which may be a commercially available IC such as NEC IC for motor controlling $\mu PC$ 147OH.

According to the prior art arrangement as shown in FIG. 1, a resistance circuit comprising the resistors $R_1$ through $R_3$ and the variable resistor $VR_1$ is connected across the terminals of the d-c motor M. In the control circuit 1, while a current flowing in the d-c motor M is directed from the terminal D to the terminal B, the current is controlled so as to keep at a constant level a counter-electromotive force generated in the d-c motor M. In the example shown in the figure, the current flowing in the terminal D is adapted to be proportional to the current entering into the terminal C, and the terminal A is used for starting the d-c motor M. In this case, the speed (revolution) of the d-c motor can be controlled by changing the resistance value of the variable resistor $VR_1$. And, the changes in motor revolution caused by the temperature characteristics of the d-c motor are compensated by the changes with temperature in the terminal voltage $V_F$ of the diode $D_1$. In the conventional type of control circuit shown in FIG. 1, however, it is necessary to additionally provide a diode $D_1$, making the circuit configuration complex. Furthermore, in the conventional control circuit where motor revolution is set by setting the resistance value r of the variable resistor $VR_1$, a voltage applied to the motor M is proportional to $1/r$. As a result, the relationship between the amount of change in the resistance r and the revolution N of the motor tends to be nonlinear, making it difficult to ensure accurate control of motor speed.

SUMMARY AND OBJECT OF THE INVENTION:

It is an object of the invention to provide a motor speed control circuit arrangement which overcomes the aforementioned problems.

It is a further object of the invention to provide a speed control device for d-c motors which is capable of accurately setting motor revolution at any desired value by maintaining a linear relationship between the amount of change in resistance and motor revolution.

It is another object of the invention to provide a speed control device for d-c motors which is capable of fine-adjusting the load characteristics of a motor over a wide range.

It is still another object of this invention to provide a speed control device for d-c motors which is capable of accurately controlling the speed of a motor and stopping the motor smoothly using a simple circuit.

The speed control device for d-c motors of this invention comprises an IC for controlling the speed of a d-c motor, having such a construction that a reference voltage is generated across terminals C and D and a current proportional to the armature current of the motor that flows in the terminal D is caused to keep flowing in the terminal C at all times such as commercially available NEC IC for motor controlling $\mu PC$ 147 OH, and a circuit arrangement having at least a transistor connected across the terminals C and D, a first resistor connected in parallel across the base and emitter of the transistor; the base of the transistor being connected to the terminal D and one terminal of the motor via a second resistor; the emitter of the transistor is connected to the terminal C; a third variable resistor is connected in parallel across the base and collector of the transistor; and the collector of the transistor is connected to the other terminal of the motor via a fourth resistor so that the resistance value of the third variable resistor and the revolution of the motor can be changed linearly.

It is still another object of the invention to provide a motor speed control circuit arrangement which is simple in design and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
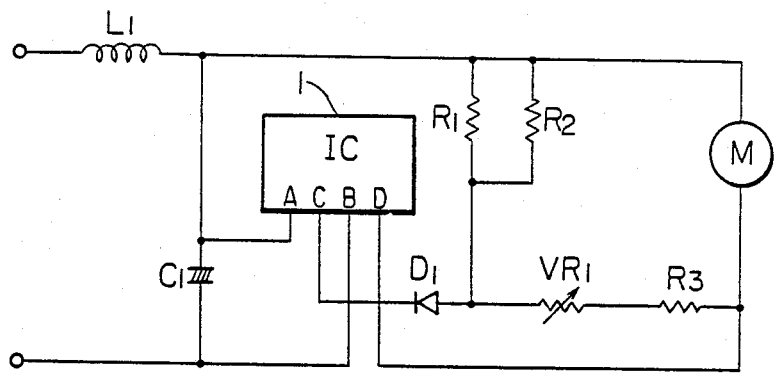
FIG. 1 is a view of a circuit configuration of a conventional type of motor speed control device.
Figure 2:
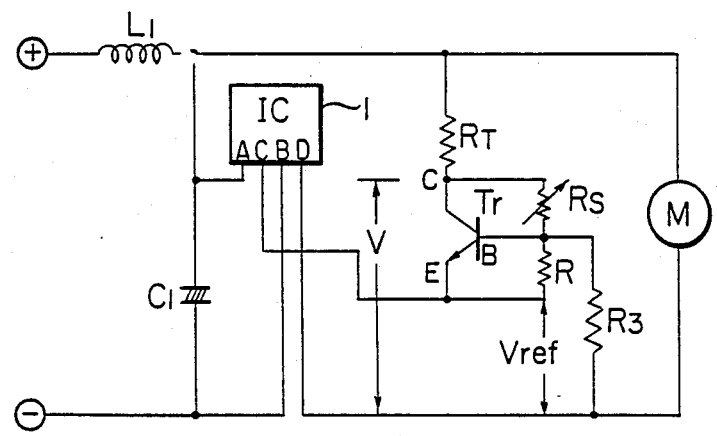
FIG. 2 is a view of a speed control device for d-c motors embodying the invention.

FIG. 2 shows the circuit configuration of a first embodiment of the invention. In the figure, like numerals correspond with like circuit elements shown in FIG. 1. RT corresponds to a parallel resistor comprising the resistors $R_1$ and $R_2$ shown in FIG. 1; $R_s$ refers to a variable resistor; R to a resistor; and $T_r$ to a transistor, respectively.

The circuit configuration shown in FIG. 2 corresponds to a configuration in which the diode $D_1$ in FIG. 1 is replaced with a transistor $T_r$. In FIG. 2, the reactor $L_1$ and the capacitor $C_1$, which are shown by the same reference symbols as shown in FIG. 1, are used for eliminating the adverse effects of ripple components.

In FIG. 2, the speed of the motor M is set by setting the value of the variable resistor $R_s$. That is, a voltage V across the collector terminal of the transistor $T_r$ and the terminal D of the control circuit 1 can be expressed by the following equation.

$$V = V_{ref} + V_{BE}\left(1 + \frac{R_s}{R}\right) + \left(\frac{V_{ref} + V_{BE}}{R_3}\right)R_s \quad (1)$$

$$= V_{ref}\left(1 + \frac{R_s}{R_3}\right) + V_{BE}\left(1 + \frac{R_s}{R} + \frac{R_s}{R_3}\right)$$

where $V_{ref}$ is a voltage across the terminal C and D, representing a reference voltage, and $V_{BE}$ is a voltage across the base and emitter of the transistor.

Since tee resistor R generally has a sufficiently high value Eq. (1) can be written as follows.

$$V = V_{ref}\left(1 + \frac{R_s}{R_3}\right) + V_{BE}\left(1 + \frac{R_s}{R_3}\right) \quad (2)$$

And, a voltage $V_M$ applied to the motor M can be expressed by $$(3) \quad V_M = V + R_T \times I$$

where I is a current flowing in the resistor $R_T$. The current I can be expressed by $$I = \frac{I_M}{K} + \frac{V_{BE}}{R} + \frac{V_{ref} + V_{BE}}{R_3} \quad (4)$$

where $I_M$ is a current entering into the terminal D, and K is a constant.

Assuming that the resistor R has a sufficiently high value, as noted earlier, the voltage $V_M$ can be expressed by $$V_M = V_{ref}\left(1 + \frac{R_s}{R_3} + \frac{R_T}{R_3}\right) + \quad (5)$$

$$V_{BE}\left(1 + \frac{R_s}{R_3} + \frac{R_T}{R_3}\right) + \frac{R_T}{K}I_M$$

Now, simplifying Ed. (5) as $$V_M = V + \frac{R_T}{R_3}(V_{ref} + V_{BE}) + \frac{R_T}{K}I_M \quad (6)$$

where $$V + \frac{R_T}{R_3}(V_{ref} + V_{BE}) = \text{constant} = V'_M$$

then yields $$V'_M + \frac{R_T}{K}I_M = E_a + R_a I_M \quad (7)$$

since the terminal voltage $V_M$ of the motor M is a sum of the counter-electromotive force $E_a$ of the motor M and the voltage drop $R_a I_M$ by the internal resistance. $R_a$.

Furthermore, selecting $R_T$ and/or K so as to satisfy $$\frac{R_T}{K} = R_a \quad (8)$$

yields.

$$V_m' = E_a. \quad (9)$$

Thus, the revolution of the motor M can be maintained constant. And, since the voltage V is proportional to the value of the variable resistor $R_s$, the counter-electromotive force $E_a$ of the motor M can be set by changing the value of the variable resistor $R_s$. As a result, the revolution of the motor M can be set at any desired value.

In addition, changes in revolution due to the temperature characteristics of the motor M are compensated as the voltage $V_{BE}$ in Eq. (2) shown above becomes small in accordance with temperature rise, shifting the voltage V in Eq. (2) to a smaller region.

Figure 3:
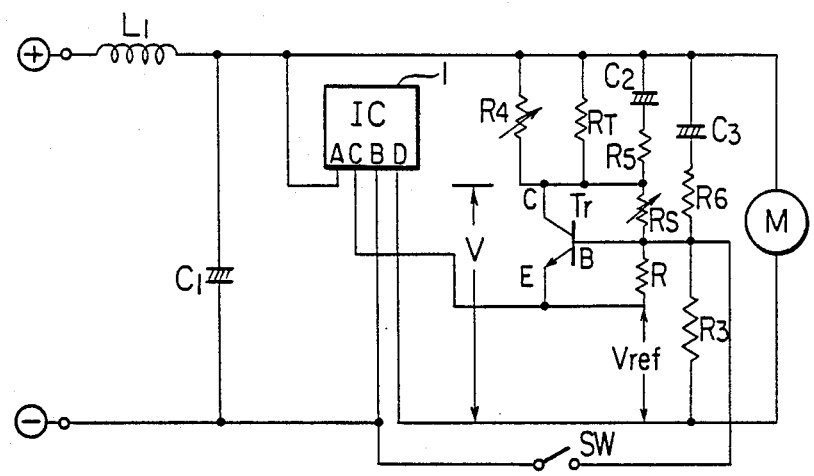
FIG. 3 is a view of another embodiment of the speed control device for d-c motors according to the invention.

FIG. 3 shows another embodiment of this invention, in which the circuit configuration shown in FIG. 2 has been modified into a slightly more practical configuration. In the figure, numerals and symbols 1, M, $T_r$, R, $R_T$, $R_s$, and $R_3$ correspond with like parts shown in FIG. 2, and $L_1$ and $C_1$ correspond with like parts shown in FIG. 2. Symbol $R_4$ refers to a variable resistor; $R_5$ and $R_6$ to fixed resistors; $C_2$ and $C_3$ to capacitors; and SW to a switch, respectively.

The operation of the configuration shown in FIG. 3, which is essentially the same as that of the configuration shown in FIG. 2, is more practical in the following points.

(i) By adding the variable resistor $R_4$, the value of the fixed resistor $R_T$ by which the load characteristics of the motor M are determined can be fine-adjusted. Thus, the load characteristics of the motor M can be selected by the fine-adjustment.

(ii) A capacitor or a series circuit comprising a capacitor and a resistor is connected across the collector and-/or base of the transistor $T_r$ and the positive or negative terminal so as to prevent hunting, and expand the range of fine-adjustment of motor characteristics.

(iii) By turning on the switch SW to connect the base of the transistor $T_r$ to the negative terminal, the transistor $T_r$ is forcibly turned off, interrupting the output of the control circuit 1 to stop the d-c motor As described above, this invention makes it possible to set motor revolution at any desired values and maintain a linear relationship between the value of the variable resistor $R_s$ and motor revolution by adjusting the variable resistor $R_s$ connected to the transistor $T_r$.

Furthermore, by providing a separate variable resistor $R_s$ such as resistor $R_4$ on the collector side of the transistor $T_r$, the load characteristics of the motor can be fine-adjusted over a wide range.

In addition, by connecting the base of the transistor $T_r$ to the negative side via a switch, the motor operation can be easily stopped.

Figure 4:
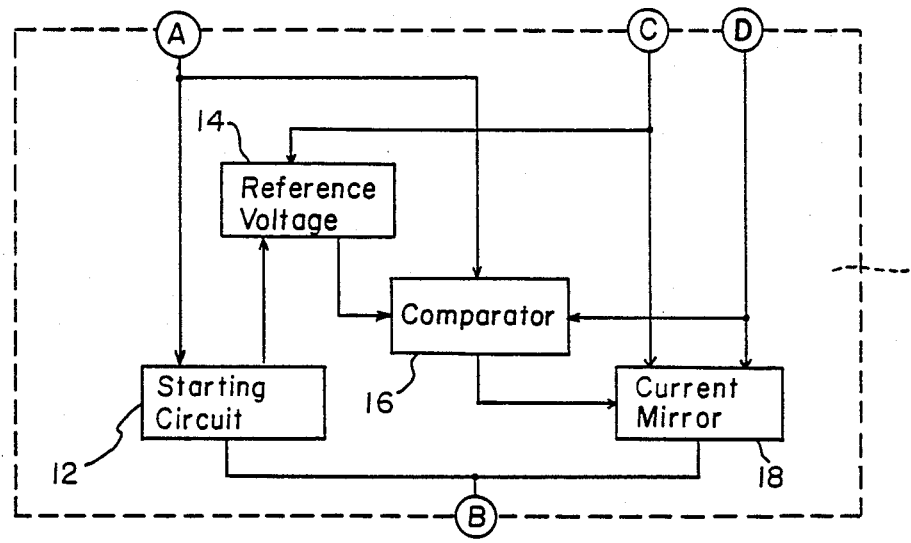
FIG. 4 is a schematic representation of the motor controlling IC employed in the invention.

FIG. 4 shows in schematic representation an IC, or the like, for controlling the speed of a d-c motor which may be employed in the embodiments of FIGS. 2 and 3 (such as NEC IC for motor controlling μPC 147OH). The input feature shown in FIG. 4 was labeled terminal A (corresponding to terminal A in FIG. 2 and 3), which terminal is preferably connected as shown in FIGS. 2 and 3. Terminal A is connected to a starting circuit 12 which in turn is connected to terminal B, which is adapted to be connected to ground as shown in FIGS. 2 and 3. Starting circuit 12 is also connected to reference voltage 14 as shown in FIG. 4. Reference voltage 14 is connected to a comparator 16. Comparator 16 is also connected to terminal A and terminal D. Terminal C is connected to reference voltage 14 and is also connected to a current mirror 18. The comparator is connected to the current mirror 18, and current mirror 18 is connected to terminal B and D as shown in FIG. 4.

With this arrangement, a reference voltage is generated across terminal C and D, and a current proportional to the armature current of the motor flowing at terminal D is induced to flow at terminal C at all times.

While specific embodiments of the invention have been shown and described in detail to illustrate the application of the principals of the invention, it will be understood that the invention may be embodied otherwise without departing from such principles.

What is claimed is:

1. A speed control device for d-c motors having a current flowing there through comprising; a speed controlling IC having terminal A, B, C and D, the speed controlling IC being constructed so that a power source is connected to said terminals A and B, and a reference voltage is generated across said terminals C and D, and a current proportional to the current flowing through the d-c motor and flowing in said terminal D is kept flowing in said terminal C at all times; at least one transistor having a base, emitter and collector being connected across said terminals C and D; a first resistor R being connected in parallel across the base and emitter of said transistor; a second resistor $R_3$ connecting said transistor base to the terminal D and also to one terminal of said motor; a variable resistor $R_s$ being connected in parallel across the base and collector of said transistor; said transistor collector being connected to the other terminal of the motor via a fourth resistor $R_T$ so as to permit the value of said third variable resistor $R_s$ and the revolution of said motor to change linearly.

2. A speed control device for d-c motors set forth in claim 1 wherein the resistance value of said first resistor is selected at a value sufficiently larger than the value of said third variable resistor as to permit the revolution of said motor to be set at any desired value by changing the value of said third variable resistor.

3. A speed control device for d-c motors set forth in claim 1 wherein a fifth variable resistor $R_4$ is connected in parallel with said fourth resistor so as to permit the load characteristics of said motor to be fine-adjusted over a wide range.

4. A speed control device for D-C motors set forth in claim 3, wherein a capacitor is connected in parallel with said fifth variable resistor so as to prevent the hunting phenomena.

5. A speed control device for D-C motors set forth in claim 3, wherein a capacitor is connected across the base of said transistor and the other terminal of said motor.

6. A speed controlled device for D-C motors according to claim 3, wherein: a series circuit comprising a capacitor and a resistor is connected in parallel with said fifth variable resistor so as to prevent the hunting phenomenon.

7. A speed controlled device for D-C motors according to claim 3, wherein: a series circuit comprising a capacitor and a resistor is connected across the base of said transistor and the other terminal of said motor.

8. A speed control device for d-c motors set forth in claim 1, wherein a switching means is provided across the base of said transistor and the negative terminal of a power supply so as to permit said motor to be stopped by said switching means.

9. A speed control device for d-c motors, the d-c motor having a current flowing therethrough, comprising: a speed control IC having terminals A, B, C and D, the speed controlling IC being constructed so that a power source is connected to said terminals A and B and includes means for generating a reference voltage across said terminal C and D in response to said power source connection, and having means for reducing a current proportional to the current flowing through the d-c motor in said terminal D and in said terminal C at all times; at least one transistor having a base, emitter and collector being connected across said terminal C and D; a first resistor R being connected in parallel across the base and emitter of said transistor; a second resistor $R_3$ connecting said transistor base to the terminal D and also to one terminal of said motor; a variable resistor $R_s$ being connected in parallel across the base and the collector of said transistor; said transistor collector being connected to the other terminal of the motor via a fourth resistor $R_T$ so as to permit the value of said third variable resistor $R_s$ and the revolution of said motor to change linearly.

* * * * *